United States Patent Office

3,381,060
Patented Apr. 30, 1968

3,381,060
LOW DENSITY POLYETHYLENE CONTAINING
TWO HIGH DENSITY POLYETHYLENES
Glenn S. Peacock, Somerville, and William H. Joyce, Somerset, N.J., assignors to Union Carbide Corporation, a corporation of New York
No Drawing. Filed July 27, 1965, Ser. No. 475,265
6 Claims. (Cl. 260—897)

ABSTRACT OF THE DISCLOSURE

The high speed extrudability of a low density polyethylene is improved by the addition of a minor amount of a high density, high molecular weight polyethylene having a melt index of not more than 0.1 and a melt flow of not more than 10 and a minor amount of a second high density polyethylene having a melt index greater than 0.1 and a melt flow greater than 10.

---

This invention relates to thermoplastic compositions useful in wire insulation. More particularly, the invention relates to thermoplastic polyethylene compositions which are extrudable into wire insulation at very high speeds without sacrifice of surface smoothness.

The search for suitable wire insulating compositions has resulted in the evaluation of numerous synthetic organic polymers. Satisfactory materials for this application must have good dielectric properties and an attractive surface appearance. Polyethylene, both low and high density, and polypropylene have low dielectric losses and have been considered to be leading candidates for wire insulation. Polypropylene, however, is deficient in low temperature toughness, with some forms having a brittle temperature of +6° C. Moreover, polypropylene is prone to oxidize and to degrade upon exposure to the atmosphere if in contact with copper. Unfortunately, the additives presently used to control oxidation and degradation of polypropylene, if used in effective amounts increase dielectric losses to unacceptable levels.

Polyethylene is an ideal wire insulation. Although high density polyethylene is generally too difficultly extrudable to be an optimum wire insulation, low density polyethylene extrudes easily and well. The only limitation encountered in the use of low density polyethylene is its lack of amenability to very high speed extrusion wire coating. Speeds of 2000 to 3000 feet per minute (f.p.m.) are now not uncommon in wire coating. High speed extrusion rates are desirable from the standpoint of operating efficiency and, moreover, are a necessity in order to keep up with the demand for insulated wire without increasing costs to an uneconomical level. High speed extrusion rates with low density polyethylene causes extrusion melt fracture and results in extruded profiles having impaired surface characteristics. Surface roughness, typified by crested and peaked waviness easily perceived by touch or sight, renders wire with low density polyethylene insulation unattractive and unsaleable.

It is an object of the present invention to provide a thermoplastic polyethylene wire insulation composition endowed with the electrical and physical property benefits of low density polyethylene wire insulation, but which is extrudable at very high rates into smooth surfaced wire insulation.

It has now been discovered in accordance with this invention that this and other objects are achieved by incorporating in a low density polyethylene extrusion composition a minor amount of a high density, high molecular weight polyethylene having a density of at least 0.930, a melt index of not more than 0.1 decigram per minute and a melt flow of not more than 10 decigrams per minute, and a minor amount of a high density polyethylene having a density of at least 0.930, a melt index of greater than 0.1 decigram per minute and a melt flow of greater than 10 decigrams per minute. In an alternate embodiment, there is incorporated in low density polyethylene having a melt index not greater than 1.0 decigram per minute minor amounts of the aforedescribed high density polyethylenes and a minor amount of polypropylene.

High density, high molecular weight, polyethylene used in this invention having a melt index of not more than 0.1 has been known for some time but only as a laboratory curiosity. Because of its high molecular weight, this polyethylene cannot be fabricated into useful articles by conventional thermoplastic forming techniques such as injection molding, blow molding, slot extrusion, die extrusion and the like. In fact, this polyethylene has not been successfully extrusion coated onto wire by any known procedure, including very slow wire coating extrusion techniques. This polyethylene can only be formed into test specimens by drastic forming techniques such as sintering and high pressure compression molding.

For all practical purposes then, the high density, high molecular weight polyethylene having a melt index of not more than 0.1 is an intractable, unprocessable polymer. Also, high density polyethylene having a melt index of greater than 0.1, as is demonstrated in the copending application of W. H. Joyce, Ser. No. 402,318, filed Oct. 7, 1964, which is a continuation-in-part of application Ser. No. 225,859, filed Sept. 24, 1962 and now abandoned, by itself when added to low density polyethylene does not reduce the extrusion melt fracture of the latter. Furthermore, again as is demonstrated in application Ser. No. 402,318, both of these high density polyethylenes themselves are prone to melt fracture. Therefore, it was quite surprising to discover that a high density polyethylene having a melt index of not more than 0.1, which itself is not extrudable, in conjunction with high density polyethylene having a melt index of greater than 0.1, which itself does not reduce extrusion melt fracture, together actually improves the extrusion characteristics of readily extrudable low density polyethylene. Moreover, because both of the aforedescribed high density polyethylenes are themselves prone to melt fracture, the constituents of the composition of this invention cooperate to produce a synergistic effect, that is, the composition exhibits a property (freedom from melt fracture) possessed by none of the constituents alone.

Normally, the chemical dissimilarity between polyethylene and polypropylene prevents blending the two to a homogenity which would enable resistance to microseparations upon tensile stress or blending flexure. This microseparation is evidenced by a whitening of the stressed, flexed insulation. However, in the present invention it has been unexpectedly discovered that the incorporation of a minor amount of polypropylene does not result in any microseparations on flexing.

The high density, high molecular weight polyethylene (melt index not greater than 0.1) has a density of at least 0.930, preferably with the range of from about 0.935 to about 0.965, and a molecular weight sufficient to have a melt index (measured at 44 p.s.i. and 190° C. according to ASTM D-1238-57T) of not more than 0.1 decigram per minute, preferably not more than 0.05 decigrams per minute, and a melt flow (measured at 440 p.s.i. and 190° C .according to ASTM D-1238-57T) of not more than 10 decigrams per minute, preferably not more than 5 decigrams per minute. Higher density polyethylene, e.g., 0.98 or higher, with these melt index and melt flow characteristics can be used if desired.

The high density polyethylene (melt index greater than 0.1) has a density of at least 0.930, preferably within the range of from about 0.935 to about 0.965, and a molecular weight sufficient to have a melt index of greater than 0.1 decigram per minute and a melt flow of greater than 10 decigrams per minute. In order to insure accurate density measurements the ash content of the high density polyethylenes should be not more than 0.2% by weight.

The molecular weight of high density polyethylenes used herein is also characterized by intrinsic viscosity (IV). Suitable high density polyethylene (melt index not more than 0.1) have a molecular weight sufficient to have an intrinsic viscosity of at least about 2.4, preferably at least about 2.8 measured in tetralin at 125° C. Suitable high density polyethylenes (melt index greater than 0.1) have a molecular weight sufficient to have an intrinsic viscosity of less than about 2.4 measured in tetraline at 125° C. Instrinsic viscosity is measured according to ASTM D-1601-61 and is calculated as described herein.

High density, high molecular weight polyethylene described herein having a melt index of less than 0.1 is employed in amounts of from about 0.3 to about 8 percent by weight. High density polyethylene having a melt index of greater than 0.1 is employed in amounts of from about 1 to about 33 percent by weight and preferably from about 1 to about 10 percent by weight. Polypropylene is employed with low density polyethylene having a melt index not greater than 1.0 in amounts of from about 1 to about 2.5 percent by weight. Percentages are by weight based on the weight of the composition.

Suitable high density polyethylene used herein having a melt index of less than 0.1 can be prepared in particle from by polymerizing ethylene in the presence of a non-solvating diluent, such as pentane, at a temperature below about 100° C. with a Phillips olefin polymerization catalyst which consists essentially of chromium oxide and at least one of silica, alumina, zirconia, and thoria, at least part of the chromium being in the hexavalent state at the initial contacting of the ethylene therewith.

A catalyst for producing high density polyethylene useful in the present invention is described in U.S. Patent 2,825,721 to J. P. Hogan et al. which is incorporated herein by reference.

The high density polyethylene whose preparation is referred to above is known as particle form polyethylene since it is formed as discrete droplets suspended in a reaction diluent. While high density polyethylenes having melt indices of less than 0.1 and produced by other known polymerization processes can be used, particle form polyethylene is preferred in this invention because of the ease with which it can be produced and its commercial availability.

For purposes of demonstrating the unique properties of the high density, high molecular weight polyethylene used in the present invention, a comparison in properties is made in Table I below among three commercially available high density polyethylenes. These polymers are (A) particle form polyethylene sold by Phillips Petroleum Company under the designation 03-2-0069, (B) solution form (so called because it dissolves in the reaction solvent) polyethylene sold by Union Carbide Corporation under the designation DGD-5770, and (C) Ziegler type polyethylene sold by Union Carbide Corporation under the designation DMD-3009.

TABLE I

| Property | High Density Polyethylene | | |
|---|---|---|---|
| | (A) | (B) | (C) |
| Density | 0.954 | 0.950 | 0.953 |
| Melt Index | 0.007 | 0.79 | 0.25 |
| Melt Flow | 1.1 | 67 | 30 |
| Intrinsic Viscosity [1] | 3.27 | 1.61 | 1.71 |

[1] Intrinsic Viscosity was determined according to the procedure of ASTM D-1601-61 and was calculated from reduced viscosity using the equation $1IV = 1RV + kC$. wherein $IV$ = intrinsic viscosity, $RV$ = reduced viscosity, $k = 0.4$, $C$ = concentration in grams of polyethylene per 100 ml. of tetralin at 125° C.

Reduced viscosity was determined in tetralin at 125° C. using a standard Ubbelohde viscometer and the equation $$\text{Reduced Viscosity} = \frac{t_s - t_0}{Ct_0}$$

wherein $t_0$ is the efflux time of the pure solvent, $t_s$ is the efflux time of the polyethylene solution.
$C$ = concentration in grams of polyethylene per 100 ml. of tetralin at 125° C.

As can readily be seen from Table I, high density, high molecular weight polyethylene having a melt index of less than 0.1, exemplified by polyethylene (A) in Table I, exhibit properties quite distinct from conventional high density polyethylenes. The high molecular weight of these polymers, indicated by the melt index, melt flow and intrinsic viscosity values, renders them unprocessable for all practical purposes whereas other conventional high density polyethylenes can be formed and molded using conventional thermoplastic fabricating techniques.

Suitable high density polyethylene used herein having a melt index of greater than 0.1 can be prepared by a solution polymerization process such as that described by Anderson in U.S. Patent 2,862,917, or by a slurry polymerization process such as that described by Ziegler in Belgian Patent 533,362. High density polyethylene having a melt index of greater than 0.1 can also be prepared by thermally cracking a particle form polyethylene, that is, one having a melt index of less than 0.1.

Low density polyethylene which is the major component of the composition of this invention has a density of from about 0.915 to about 0.925 and preferably from about 0.918 to about 0.922. The melt index of the low density polyethylene is not narrowly critical, generally within the range of about 0.1 to about 10 decigrams per minute measured at 44 p.s.i. and 190° C., except when polypropylene is present in the composition in which case the melt index cannot be greater than 1.0 otherwise melt fracture will occur.

The high density polyethylenes described herein can be incorporated in low density polyethylene by any of the techniques known and used in the art to blend and compound thermoplastics to homogeneous masses. Among other techniques are fluxing in a variety of apparatus including multi-roll mills, screw mills, compounding extruders and Banbury mixers, dissolving in mutual or compatible solvents and like or equivalent methods.

The composition of the present invention can contain in the usual amounts, conventional additives, e.g. fillers, extenders, opacifiers, modifiers, and stabilizers.

The following examples are intended to further illustrate the present invention without limiting the same in any manner. All parts and percentages are by weight unless indicated otherwise.

The following ASTM procedures were used to obtain data in the examples:

Density _____ ASTM D-792-50
Melt Glow (440 p.s.i., 190° C.) __ ASTM D-1238-57T
Melt Index (44 p.s.i., 190° C.) ___ ASTM D-1238-57T Melt fracture determinations were made by a panel of three persons comparing wire samples with extruded insulation thereon. Each sample was graded as follows:

1=no melt fracture
2=slight melt fracture
3=extensive melt fracture
4=extreme melt fracture The average of the three grades for each sample was reported as the melt fracture rating.

In the examples and controls, compositions were prepared by fluxing the components in a Banbury mixer at a temperature of about 170–190° C. The material was then sheeted and granulated for extrusion. The extrusion onto wire was carried out using a No. 1 Royle 2.5 inch barrel extruder fitted with a Hartig wire crosshead and a die.

less than 0.1 and high density polyethylene having a melt index greater than 0.1 completely eliminates melt fracture (Table II, Examples 1–4). The inclusion of a small amount of polypropylene also eliminates melt fracture (Examples 5–8) whereas the incorporation of more than 2.5 percent does not (control 9) as does the incorporation of polypropylene in low density polyethylene having a melt index of greater than 1.0 (control 8).

We claim:

1. Composition exhibiting freedom from melt fracture comprising low density polyethylene having a density of from about 0.915 to about 0.925, from about 0.3 to about 8 percent by weight of a first high density polyethylene having a density of from about 0.930 to about 0.965, a melt index of not more than 0.1 decigram per minute

TABLE II.—EXAMPLES

|  | 1 | 2 | 3 | 4 | 5 | 6 | 7 | 8 | 10 | 10 | 11 |
|---|---|---|---|---|---|---|---|---|---|---|---|
| Polyethylene (<0.1 MI): | | | | | | | | | | | |
| Density Grams per cc | 0.942 | d 0.954 | e 0.939 | d 0.954 | 0.942 | 0.942 | 0.942 | e 0.939 | | | |
| Melt Index Decigrams per minute | 0.001 | 0.007 | 0.007 | 0.007 | 0.001 | 0.001 | 0.001 | 0.007 | | | |
| Melt Flow Decigrams per minute | 2.5 | 1.1 | 1.1 | 1.1 | 2.5 | 2.5 | 2.5 | 1.1 | | | |
| Percent by Weight | 0.8 | 0.5 | 1.5 | 7 | 0.4 | 0.6 | 0.6 | 4 | | | |
| Polyethylene (>0.1 MI): | | | | | | | | | | | |
| Density Grams per cc | b 0.950 | 0.95 | 0.95 | 0.953 | b 0.950 | b 0.950 | b 0.950 | 0.953 | | | |
| Melt Index Decigrams per minute | 1.0 | 0.79 | 0.79 | 0.25 | 1.0 | 1.0 | 1.0 | 0.25 | | | |
| Melt Flow Decigrams per minute | 100 | 67 | 67 | 30 | 100 | 100 | 100 | 30 | | | |
| Percent by Weight | 4.2 | 5 | 33 | 10 | 2.1 | 3.4 | 3.4 | 6 | | | |
| Low Density Polyethylene: | | | | | | | | | | | |
| Density Grams per cc | 0.92 | 0.92 | 0.92 | 0.92 | 0.92 | 0.92 | 0.92 | 0.92 | | | |
| Melt Index Decigrams per minute | 0.1 | 0.25 | 0.25 | 0.25 | 0.25 | 0.25 | 0.1 | 0.25 | | | |
| Melt Flow Decigrams per minute | 16 | 35 | 35 | 35 | 35 | 35 | 16 | 35 | | | |
| Percent by Weight | 94.9 | 94.4 | 65.4 | 82.9 | 94.9 | 93.9 | 93.9 | 88.9 | | | |
| Polypropylene: | | | | | | | | | | | |
| Density Grams per cc | | | | | 0.90 | 0.90 | 0.90 | 0.90 | | | |
| Melt Flow Decigrams per minute at 440 p.s.i. and 230° C | | | | | 4 | 4 | 4 | 4 | | | |
| Percent by Weight | | | | | 2.5 | 2.0 | 2.0 | 1.0 | | | |
| Antioxidant a | 0.1 | 0.1 | 0.1 | 0.1 | 0.1 | 0.1 | 0.1 | 0.1 | | | |
| Extrusion Speed, feet per minute | 4,000 | 4,000 | 4,000 | 4,000 | 4,000 | 4,000 | 4,000 | 4,000 | | | |
| Wire Size, Awg No | c 24 | 19 | 19 | 19 | 24 | 24 | 24 | 19 | | | |
| Melt Fracture Rating | 1 | 1 | 1 | 1 | 1 | 1 | 1 | 1 | | | | a 4,4′thiobis-(6-t-butyl meta cresol).
b Contains 2% polymerized 1-butene.
c 0.02 inch diameter copper wire.
d Phillips particle form polyethylene 03-2-0009.
e Particle form polyethylene 03-2-0040.

TABLE III.—CONTROLS

|  | 1 | 2 | 3 | 4 | 5 | 6 | 7 | 8 | 9 | 10 |
|---|---|---|---|---|---|---|---|---|---|---|
| Polyethylene (<0.1 MI): | | | | | | | | | | |
| Density Grams per cc | 0.95 | 0.953 | c 0.954 | d 0.939 | 0.95 | 0.953 | 0.954 | d 0.939 | | |
| Melt Index Decigrams per minute | 0.79 | 0.25 | 0.007 | 0.007 | 0.79 | 0.25 | 0.007 | 0.007 | | |
| Melt Flow Decigrams per minute | 67 | 30 | 1.1 | 1.1 | 67 | 30 | 1.1 | 1.1 | | |
| Percent by Weight | 99.9 | 99.9 | 99.9 | 99.9 | 3 | 7 | 2 | 4 | | |
| Polyethylene (>0.1 MI): | | | | | | | | | | |
| Density Grams per cc | | | | | | | | 0.95 | 0.953 | |
| Melt Index Decigrams per minute | | | | | | | | 0.79 | 0.25 | |
| Melt Flow Decigrams per minute | | | | | | | | 67 | 30 | |
| Percent by Weight | | | | | | | | 7 | 8 | |
| Low Density Polyethylene: | | | | | | | | | | |
| Density Grams per cc | 0.92 | | | | | 0.92 | 0.92 | 0.92 | 0.92 | |
| Melt Index Decigrams per minute | 0.25 | | | | | 0.25 | 0.25 | 2.0 | 0.25 | |
| Melt Flow Decigrams per minute | 35 | | | | | 35 | 35 | 45 | 35 | |
| Percent by Weight | 99.9 | | | | | 96.9 | 92.9 | 88.9 | 84.9 | |
| Polypropylene: | | | | | | | | | | |
| Density Grams per cc | | | | | | | | 0.90 | 0.90 | |
| Melt Flow Decigrams per minute at 440 p.s.i. and 230° C | | | | | | | | 4 | 4 | |
| Percent by Weight | | | | | | | | 2 | 3 | |
| Antioxidant a | 0.1 | 0.1 | 0.1 | 0.1 | 0.1 | 0.1 | 0.1 | 0.1 | 0.1 | |
| Extrusion Speed, feet per minute | 4,000 | 2,400 | 2,400 | (e) | (e) | 2,400 | 2,400 | 4,000 | 4,000 | |
| Wire Size, Awg No | b 24 | 24 | 24 | | | 24 | 24 | 24 | 24 | |
| Melt Fracture Rating | 4 | 4 | 4 | | | 4 | 4 | 4 | 4 | | a 4-4′-thiobis-(6-t-butyl meta cresol).
b 0.02 inch diameter copper wire.
c Phillips particle form polyethylene 03-2-0069.
d Contains 1% polymerized 1-butene-Phillips particle form polyethylene 03-2-0040.
e Not extrudable.

Tables II and III demonstrate that low density polyethylene (control 1) and high density polyethylenes having melt indices greater than 0.1 (controls 2 and 3) by themselves undergo extreme melt fracture under high speed extrusion conditions. High density polyethylenes having melt indices less than 0.1 (controls 4 and 5) have such high molecular weights as to be not extrudable onto wire. Controls 6 and 7 demonstrate that the incorporation of high density polyethylene having a melt index greater than 0.1 into low density polyethylene does not reduce the melt fracture of the latter. However, the joint use of high density polyethylene having a melt index of measured at 44 p.s.i. and 190° C. and a melt flow of not more than 10 decigrams per minute measured at 440 p.s.i. and 190° C., and from about 1 to about 33 percent by weight of a second high density polyethylene having a density of from about 0.930 to about 0.965, a melt index of greater than 0.1 decigram per minute measured at 44 p.s.i. and 190° C., and a melt flow of greater than 10 decigrams per minute measured at 440 p.s.i. and 190° C., the melt index of said low density polyethylene being no greater than about 250 times the melt index of said first high density polyethylene 2. Composition of claim 1 wherein said second high density polyethylene is present in an amount of from about 1 to about 10 percent by weight.

3. Composition exhibiting freedom from melt fracture comprising low density polyethylene having a density of from about 0.915 to about 0.925 and a melt index of not greater than 1 decigram per minute measured at 44 p.s.i. and 190° C., from about 0.3 to about 8 percent by weight of a first high density polyethylene having a density of from about 0.930 to about 0.965, a melt index of not more than 0.1 decigram per minute measured at 44 p.s.i. and 190° C. and a melt flow of not more than 10 decigrams per minute measured at 440 p.s.i. and 190° C., from about 1 to about 33 percent by weight of a second high density polyethylene having a density of from about 0.930 to about 0.965, a melt index of greater than 0.1 decigram per minute measured at 44 p.s.i. and 190° C. and a melt flow of greater than 10 decigrams per minute measured at 440 p.s.i. and 190° C., and from about 1 to about 2.5 percent by weight of polypropylene, the melt index of said low density polyethylene being no greater than about 250 times the melt index of said first high density polyethylene.

4. An insulated electrical conductor comprising an electrical conductor and as insulation therefor a composition exhibiting freedom from melt fracture comprising low density polyethylene having a density of from about 0.915 to about 0.925, from about 0.3 to about 8 percent by weight of a first high density polyethylene having a density of from about 0.930 to about 0.965, a melt index of not more than 0.1 decigram per minute measured at 44 p.s.i. and 190° C. and a melt flow of not more than 10 decigrams per minute measured at 440 p.s.i. and 190° C., and from about 1 to about 33 percent by weight of a second high density polyethylene having a density of from about 0.930 to about 0.965, a melt index of greater than 0.1 decigram per minute measured at 44 p.s.i. and 190° C. and a melt flow of greater than 10 decigrams per minute measured at 440 p.s.i. and 190° C., the melt index of said low density polyethylene being no greater than about 250 times the melt index of said first high density polyethylene.

5. Insulated conductor of claim 4 wherein said second high density polyethylene is present in an amount of from about 1 to about 10 percent by weight.

6. An insulated electrical conductor comprising an electrical conductor and as insulation therefor a composition exhibiting freedom from melt fracture comprising low density polyethylene having a density of from about 0.915 to about 0.925 and a melt index of not greater than 1 decigram per minute measured at 44 p.s.i. and 190° C., from about 0.3 to about 8 percent by weight of a first high density polyethylene having a density of from about 0.930 to about 0.965, a melt index of not more than 0.1 decigram per minute measured at 44 p.s.i. and 190° C. and a melt flow of not more than 10 decigrams per minute measured at 440 p.s.i. and 190° C., from about 1 to about 33 percent by weight of a second high density polyethylene having a density of from about 0.930 to about 0.965, a melt index of greater than 0.1 decigram per minute measured at 44 p.s.i. and 190° C. and a melt flow of greater than 10 decigrams per minute measured at 440 p.s.i. and 190° C., and from about 1 to about 2.5 percent by weight of polypropylene, the melt index of said low density polyethylene being no greater than about 250 times the melt index of said first high density polyethylene.

References Cited
UNITED STATES PATENTS

| 3,179,720 | 4/1965 | Hillmer | 260—897 |
| 3,254,139 | 5/1966 | Anderson et al. | 260—897 |

FOREIGN PATENTS 641,321  5/1962  Canada.

GEORGE F. LESMES, *Primary Examiner.*

M. TILLMAN, *Examiner.*

T. G. FIELD, *Assistant Examiner.*